Patented July 14, 1953

2,645,645

UNITED STATES PATENT OFFICE 2,645,645

CHLOROMETHYLATION OF ARYLAMINO-POLYCYCLIC QUINONES

David I. Randall, Easton, Pa., and Edgar E. Renfrew, Phillipsburg, N. J., assignors to General Aniline & Film Corporation, New York, N. Y., a corporation of Delaware No Drawing. Application December 20, 1950, Serial No. 201,868

4 Claims. (Cl. 260—359)

This invention relates to vat dye intermediates of arylaminopolycyclic quinones. More particularly it relates to the chloromethylation products of arylamino-anthanthrone, -dibenzpyrene quinone, and -pyranthrone compounds.

Vat dyes of arylaminopolycyclic quinones are insoluble and not substantive to fabrics as such, but form a valuable class of dyes due to their ability to pass into solution in a reduced or leuco form which may be applied to the fabric. Alkaline solutions of the reduced or leuco form of these dyes possess great affinity for the fiber and may be readily reoxidized by known methods to reform the insoluble dye on the fiber.

It has now been discovered that the arylamino-anthanthrone, arylamino-dibenzpyrene quinone, and arylamino-pyranthrone vat dyes may be converted to their halomethyl and particularly chloromethyl derivatives. These chloromethyl derivatives form an extremely valuable new class of vat dye intermediates. Highly colored soluble dyes may be prepared from these intermediates by conversion to the quaternary ammonium and isothiouronium compounds as disclosed in our copending application Serial No. 201,869, filed on even date herewith. Such conversion products may be used to dye cotton directly from aqueous solution. The unconverted chloromethylated arylamino-anthanthrone, -dibenzpyrene quinone, and -pyranthrone compounds are also valuable as vat dyes themselves. When the chloromethyl derivatives are fused in alkali, the corresponding methyl compounds are produced by reduction of the chloromethyl groups.

The chloromethyl arylamino-anthanthrones, -dibenzpyrene quinones, and -pyranthrones of this invention also may be vatted to produce the corresponding methyl derivatives on the fiber. The reduction compounds produced by vatting are considerably brighter than the methyl derivatives synthesized by caustic fusion of these chloromethyl arylaminopolycyclic quinones. The developed dyes are distinguished by their excellent fastness properties.

The chloromethyl derivatives are produced from any of the arylamino-anthanthrones, -dibenzpyrene quinones, or -pyranthrones such as mono- and di-(p-toluidino)-anthanthrone; mono- and di-(anilino)-anthanthrone; mono- and di-(p-chlorophenylamino)-anthanthrone; mono- and di-(p-toluidino)-dibenzpyrene quinone; mono- and di-(anilino)-dibenzpyrene quinone; mono- and di(p-chlorophenylamino)-dibenzpyrene quinone; mono-p-toluidinotribromo-pyranthrone; di-p-toluidinodibromo-pyranthrone; tri-p-toluidinobromo-pyranthrone; and tetra-p-toluidino-pyranthrone; and the corresponding anilino and p-chlorophenylamino pyranthrones. Typical structural formulae for these starting materials are:

(1) di-{anilino, p-toluidino, p-chlorophenylamino}-anthanthrone

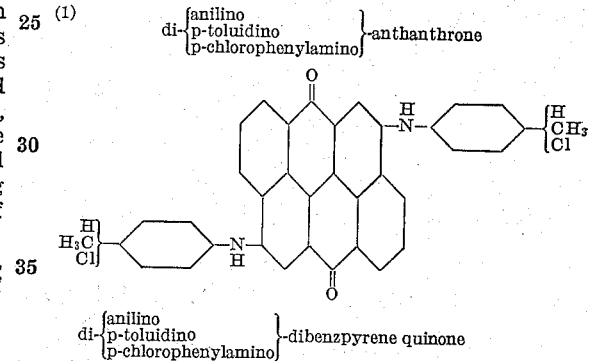

(2) di-{anilino, p-toluidino, p-chlorophenylamino}-dibenzpyrene quinone

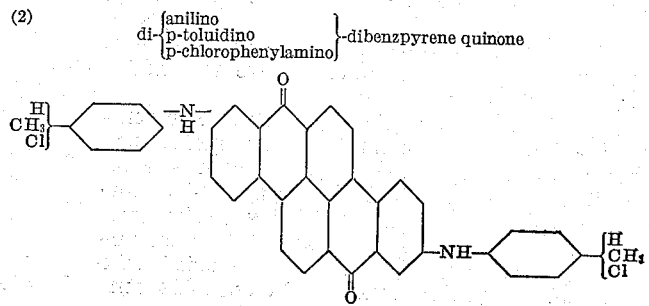

(3) tetra-{anilino, p-toluidino, p-chlorophenylamino}-pyranthrone

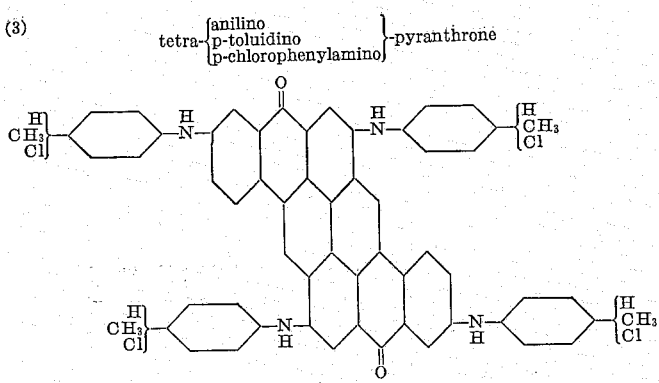

The reaction may be represented by the following equations:

(1)
$$R(-NHX)_n + ClCH_2-O-CH_2Cl \xrightarrow{H_2SO_4} R(-NHX-CH_2Cl)_n \atop (CH_2Cl)_{2-n}$$

wherein R is an anthanthronyl or dibenzpyrene quinonyl radical; X is an aryl radical such as phenyl or naphthyl; n in an integer from 1 to 2.

(2)
$$R'(-NHX)_{n_1} + ClCH_2-O-CH_2Cl \xrightarrow{H_2SO_4} R'(-NHX-CH_2Cl)_{n_1} \atop (CH_2Cl)_{4-n_1}$$

wherein R' is the pyranthronyl radical; X has the same value as above, and $n_1$ is an integer from 1 to 4.

The anthanthrone, dibenzpyrene quinone, or pyranthrone arylamino compound is dissolved in concentrated sulfuric acid of at least 95% $H_2SO_4$. Dichloro-dimethyl ether is introduced while stirring at room temperature. The reaction mixture is then stirred for several hours at from 30°–80° C. After cooling, the reaction mixture is poured into a large amount of water and ice. The precipitate is collected and washed with water until neutral.

The invention will be further described with respect to the following examples which are intended to be illustrative of the invention but not limitative of its scope. Unless otherwise stated, the parts are by weight.

*Example 1*

In a suitable vessel there was placed 940.0 parts sulfuric acid (99.7%). To it there was added slowly 103.0 parts di - p - toluidino - anthanthrone. When solution was achieved, there was added with stirring 230.0 parts bischloromethyl ether. The temperature of the reaction mixture was maintained at 60° for sixteen hours. The mixture, after cooling, was poured into a large amount of water and ice; the material which precipitated was collected on a filter and washed with water until the washings ran neutral. The dried cake weighed 130 parts. Analysis showed it to contain 11.8% chlorine. A product bearing two chloromethyl groups has the formula $$C_{38}H_{26}O_2N_2Cl_2;$$

Cl=11.6%. Its structure is represented as:

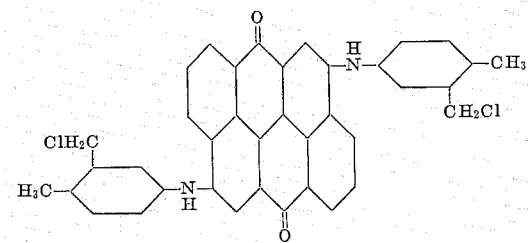

*Example 2*

In a suitable vessel there was placed 940.0 parts sulfuric acid (99.7%). To it there was added slowly 103.0 parts di-(p-toluidino)-dibenzpyrene quinone. When solution was achieved, there was added with stirring 230.0 parts bischloromethyl ether. The temperature of the reaction mixture was maintained at 60° C. for sixteen hours. The mixture, after cooling, was poured into a large amount of water and ice. The material which precipitated was collected on a filter and washed with water until the washings ran neutral. The dried cake weighed 130 parts. Analysis showed it to contain 11.8% chlorine. A product bearing two chloromethyl groups has the formula $$C_{38}H_{26}O_2N_2Cl_2;$$

Cl=11.6%. Its structure is represented as:

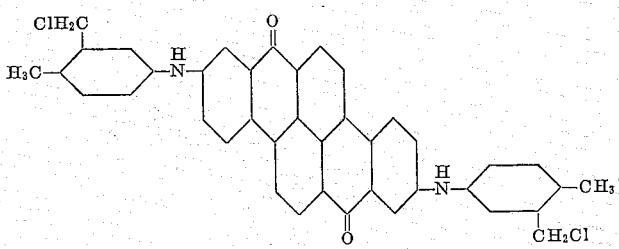

*Example 3*

In a suitable vessel there was placed 940.0 parts sulfuric acid (99.7%). To it there was added slowly 165.0 parts tetratoluidino-pyranthrone. When solution had been achieved, there was added with stirring 276.0 parts bischloromethyl ether. The temperature of the reaction mixture was maintained at 60° C. for sixteen hours. The mixture, after cooling, was poured into a large amount of water and ice; the material which precipitated was collected on a filter and washed with water until the washings ran neutral. Analysis of the dried product showed it to contain 13.7% chlorine. A compound bearing four chloromethyl groups has the formula $$C_{62}H_{46}O_2N_4Cl_4;$$

Cl=13.9%. Its structure is represented as:

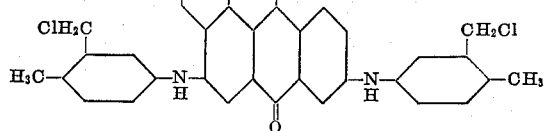

We claim:
1. Vat dye intermediates selected from the group consisting of anthanthrones, having the formula

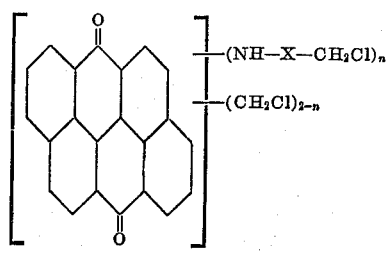

dibenzpyrene quinones, having the formula

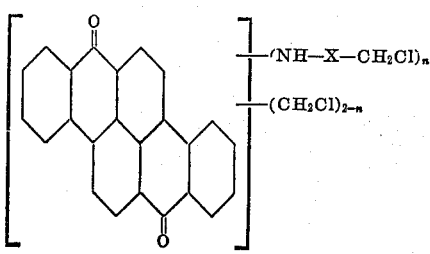

and pyranthrones, having the formula

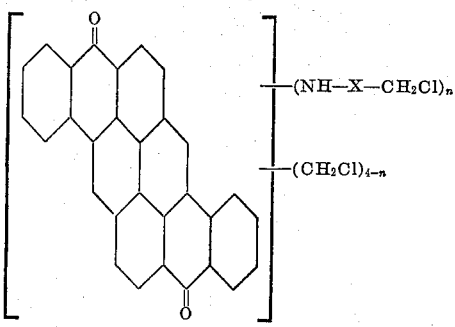

wherein X is an aryl radical, $n$ is an integer from 1 to 2, and $n$ is an integer from 1 to 4.

2. The vat dye intermediate having the formula:

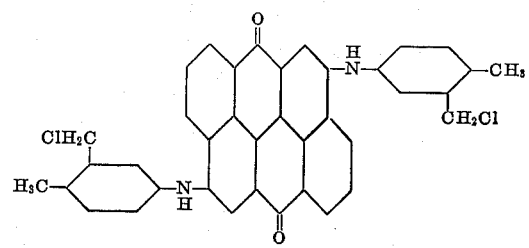

3. The vat dye intermediate having the formula:

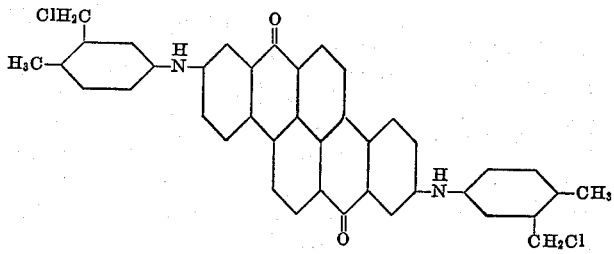

4. The vat dye intermediate having the formula:

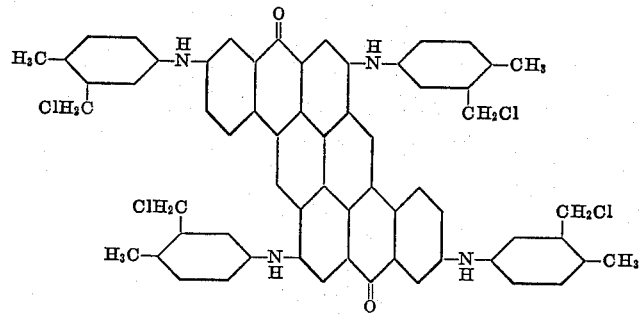

DAVID I. RANDALL.
EDGAR E. RENFREW.

References Cited in the file of this patent
UNITED STATES PATENTS

| Number | Name | Date |
|---|---|---|
| 2,531,464 | Randall et al. | Nov. 28, 1950 |
| 2,531,465 | Randall et al. | Nov. 28, 1950 |

FOREIGN PATENTS

| Number | Country | Date |
|---|---|---|
| 612,222 | Great Britain | Nov. 10, 1948 |
| 613,983 | Great Britain | Dec. 7, 1948 |
| 623,997 | Great Britain | May 26, 1949 |
| 623,998 | Great Britain | May 26, 1949 |